(12) United States Patent
Chidambaram et al.

(10) Patent No.: US 7,554,612 B2
(45) Date of Patent: Jun. 30, 2009

(54) METHOD AND SYSTEM FOR BUFFERING PIXEL DATA

(75) Inventors: Dinakaran Chidambaram, Indianapois, IN (US); Guenter Anton Grimm, Deisslingen (DE)

(73) Assignee: Thomson Licensing, Bologne, Billancourt (FR)

( * ) Notice: Subject to any disclaimer, the term of this patent is extended or adjusted under 35 U.S.C. 154(b) by 1313 days.

(21) Appl. No.: 10/381,264

(22) PCT Filed: Dec. 11, 2000

(86) PCT No.: PCT/US00/33534

§ 371 (c)(1),
(2), (4) Date: Mar. 21, 2003

(87) PCT Pub. No.: WO02/30115

PCT Pub. Date: Apr. 11, 2002

(65) Prior Publication Data

US 2004/0172653 A1    Sep. 2, 2004

(30) Foreign Application Priority Data

Oct. 3, 2000    (WO) .............................. US00/27149

(51) Int. Cl.
*H04N 9/64* (2006.01)
*H04N 7/01* (2006.01)
*H04N 11/20* (2006.01)

(52) U.S. Cl. ...................... 348/714; 348/445; 348/556; 348/581

(58) Field of Classification Search .................. 348/716, 348/458, 556, 561, 581, 441, 445, 448, 714, 348/715, 555; 345/660, 671, 670; 382/299, 382/298
See application file for complete search history.

(56) References Cited

U.S. PATENT DOCUMENTS

| | | | | |
|---|---|---|---|---|
| 5,584,032 A | | 12/1996 | Hyatt | 395/800 |
| 5,613,084 A | * | 3/1997 | Hau et al. | 711/219 |
| 5,734,434 A | * | 3/1998 | Kettenis | 348/445 |
| 5,754,162 A | * | 5/1998 | Cahill, III | 345/660 |
| 6,078,361 A | | 6/2000 | Reddy | 348/558 |
| 6,956,625 B2 | * | 10/2005 | Kim | 348/806 |

FOREIGN PATENT DOCUMENTS

WO    98/41011    9/1998

* cited by examiner

*Primary Examiner*—M. Lee
(74) *Attorney, Agent, or Firm*—Robert D. Shedd; Vince E. Duffy; Michael A. Pugel

(57) ABSTRACT

A method and system for buffering pixels of a pixel line such that complex processing circuitry between a horizontal format converter buffer and a horizontal format converter filter is not required. The horizontal format converter buffer includes multiple parallel circular buffers that are addressable by a controller such that a variable sequence of pixels may be read from the horizontal format converter buffer to the horizontal format converter filter. The controller may turn off selected circular buffers of the horizontal format converter buffer if the selected buffers are not necessary for processing a pixel line.

16 Claims, 7 Drawing Sheets

METHOD AND SYSTEM FOR BUFFERING PIXEL DATA

This application claims the benefit under 35 U.S.C. § 365 of International Application PCT/US00/33534, filed Dec. 11, 2000, which was published in accordance with PCT Article 21(2) on Apr. 11, 2002 in English; and which claims benefit of PCT International Application No. PCT/US00/27149 filed Oct. 3, 2000.

FIELD OF THE INVENTION

The present invention relates to processing pixel representative data in a video processing system.

BACKGROUND OF THE INVENTION

A typical television broadcast station transmits video signals in standard resolution. When the video signals are received by a video signal receiver, the standard resolution is expanded if the resolution of the display associated with the video signal receiver is higher than the standard resolution, compressed if the resolution of the display is less than the standard resolution, or left unchanged if the resolution of the display is the same as the standard resolution. A conventional video signal receiver includes a main-channel format converter (MFC) for expanding or compressing the resolution of the received video signal. The MFC includes a horizontal format converter (HFC) for performing resolution conversion in the horizontal direction and a vertical format converter (VFC) for performing resolution conversion in the vertical direction.

Referring now to FIG. 1, a conventional HFC 10 is shown. HFC 10 includes, inter alia, a circular or FIFO buffer 12, processing circuitry 16, a HFC filter 18, and a HFC controller 14. In operation, an incoming video stream is buffered in FIFO buffer 12. The video stream consists of a series of frames. Each frame contains a series of lines, and each of the lines contains a plurality of pixels. Detection circuitry (not shown) detects the resolution of the incoming video stream, compares the detected resolution to the known resolution of the associated display, and transmits an appropriate zoom ratio signal to HFC controller 14. The zoom ratio is an expansion or compression ratio that may be expressed as follows:

Zoom ratio=(output data size)/(input data size)

Thus, if the zoom ratio is greater than 1, expansion of the input data (i.e., expansion of the horizontal pixel line buffered in FIFO buffer 12) is necessary. If the zoom ratio is less than 1, compression of the input data (i.e., compression of the horizontal pixel line buffered in FIFO buffer 12) is necessary. If the zoom ratio is equal to 1, neither compression nor expansion of the input data is necessary.

For example, if the zoom ratio is 1/3 then HFC filter 18 requires three input pixels to generate an output pixel. Thus, a fixed sequence of input pixels (3, 3, 3...) is necessary to generate the desired output pixels. If the zoom ratio is 4/10 then HFC filter requires ten input pixels to generate four output pixels. This is achieved by deriving the first output pixel from the first three input pixels, the second output pixel from the next two input pixels, the third output pixel from the next three input pixels, and the fourth output pixel from the final two input pixels. Thus, a variable sequence of input pixels (3, 2, 3, 2...) is necessary to generate the desired output pixels.

In conventional HFC 10, FIFO buffer 12 has a fixed data size. In other words, FIFO buffer 12 outputs a fixed sequence of input pixels (e.g., 1, 2, or 3 pixels) in response to a read request from HFC controller 14. If the required number of input pixels is different from the number of input pixels read from FIFO buffer 12, HFC controller 14 configures complicated processing circuitry 16 to provide HFC filter 18 with the necessary sequence of input pixels required to permit HFC filter 18 to generate the desired output pixels. The utilization of the processing circuitry 16 suffers from a number of drawbacks. One drawback is that processing circuitry 16 requires multiple clock cycles to generate a variable pixel sequence from the fixed output FIFO buffer 12 and, thus, slows the throughput of HFC 10. Another drawback is that processing circuitry 16 uses up expensive real estate on an integrated circuit that might otherwise be utilized for other critical functions.

The present invention is directed to overcoming the drawbacks discussed above.

SUMMARY OF THE INVENTION

The buffering method and system of the present invention facilitates the compression or expansion of a pixel line by adapting an HFC buffer such that a variable sequence of parallel pixels may be read from the HFC buffer to an HFC filter without the use of complex processing circuitry.

DETAILED DESCRIPTION OF THE PREFERRED EMBODIMENT

The characteristics and advantages of the present invention will become more apparent from the following description, given by way of example.

Figure 1:
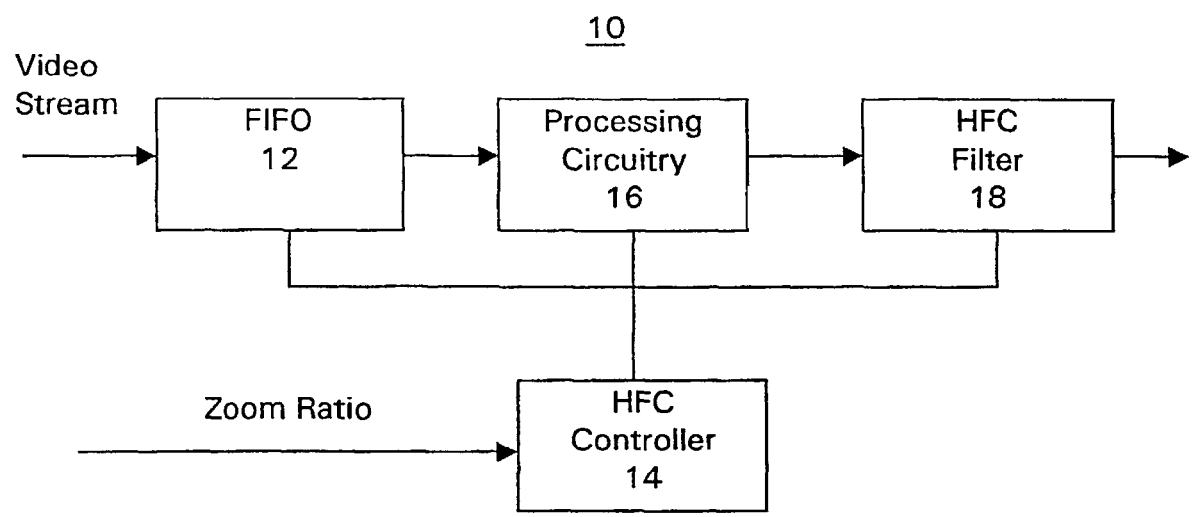
FIG. 1 is a block diagram of a conventional horizontal format converter.
Figure 2:
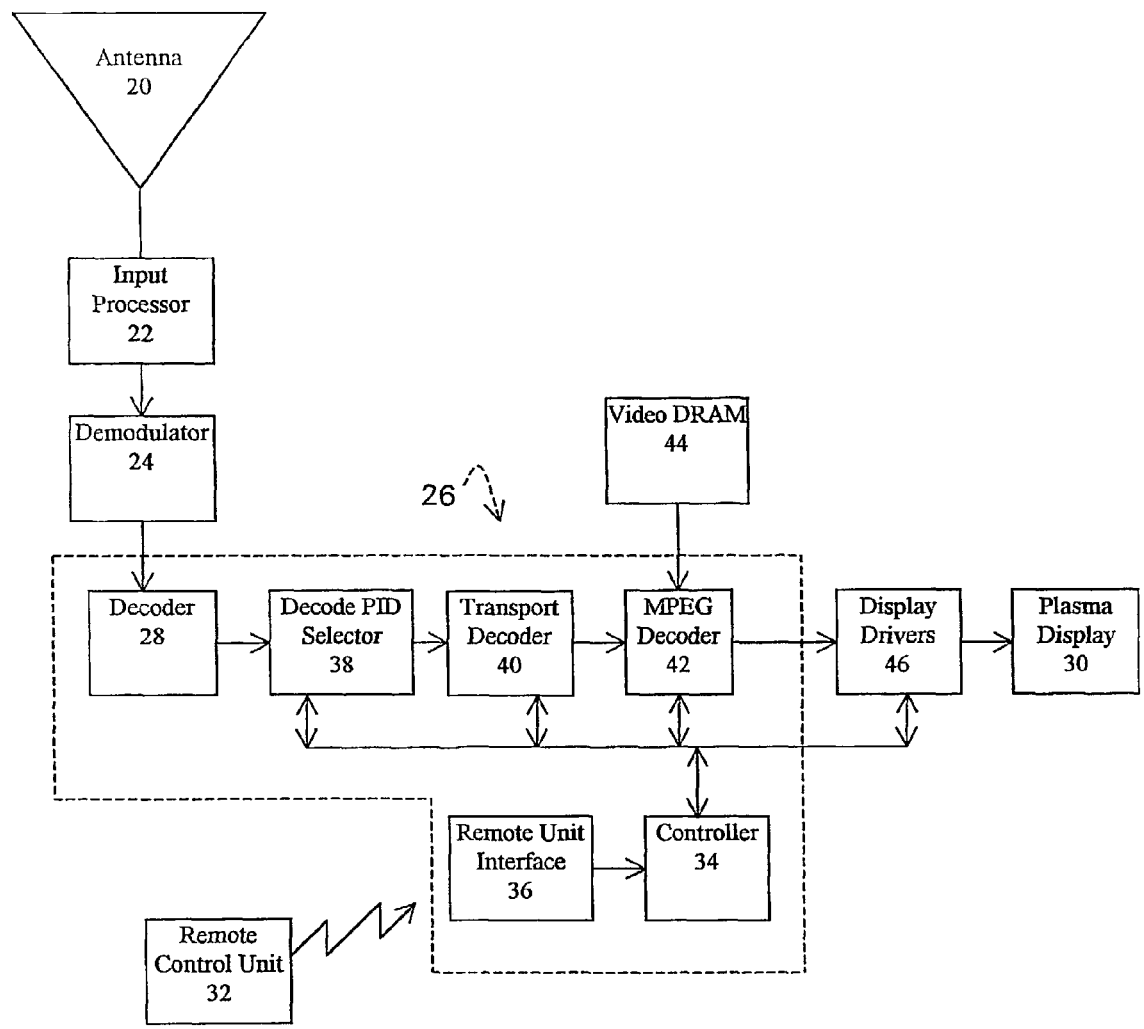
FIG. 2 illustrates an exemplary digital video receiver system for a plasma display.

Referring to FIG. 2, a block diagram of an exemplary digital video receiving system that operates according to the principles of the invention is shown. The video receiver system includes an antenna 20 and an input processor 22 for receiving and digitizing a broadcast carrier modulated with signals carrying audio, video, and associated data, a demodulator 24 for receiving and demodulating the digital output signal from input processor 22, and a decoder 28 outputting a signal that is trellis decoded, mapped into byte length data segments, de-interleaved, and Reed-Solomon error corrected. The corrected output data from decoder unit 28 is in the form of an MPEG compatible transport data stream containing program representative multiplexed audio, video, and data components.

A processor 26 processes the data output from decoder 28 such that the processed data can be displayed on a digital display unit 30 (e.g., an HDTV plasma display unit) in accordance with requests input by a user via a remote control unit 32. More specifically, processor 26 includes a controller 34 that interprets requests received from remote control unit 32 via remote unit interface 36 and appropriately configures the elements of processor 26 to carry out user requests (e.g., channel and/or OSD display). In one exemplary mode, controller 34 configures the elements of processor 26 to provide MPEG decoded data and an OSD for display on display unit 30.

Processor 26 includes a decode PID selection unit 38 that identifies and routes selected packets in the transport stream from decoder 28 to transport decoder 40. The transport stream from decoder 28 is demultiplexed into audio, video, and data components by transport decoder 40 and is further processed by the other elements of processor 26, as described in further detail below.

The transport stream provided to processor 26 comprises data packets containing program channel data, ancillary system timing information, and program specific information such as program content rating and program guide information. Transport decoder 40 directs the ancillary information packets to controller 34 which parses, collates, and assembles the ancillary information into hierarchically arranged tables. Individual data packets comprising the user selected program channel are identified and assembled using the assembled program specific information. The system timing information contains a time reference indicator and associated correction data (e.g. a daylight savings time indicator and offset information adjusting for time drift, leap years, etc.). This timing information is sufficient for a decoder to convert the time reference indicator to a time clock (e.g., United States east coast time and date) for establishing a time of day and date of the future transmission of a program by the broadcaster of the program. The time clock is useable for initiating scheduled program processing functions such as program play, program recording, and program playback. Further, the program specific information contains conditional access, network information, and identification and linking data enabling the system of FIG. 2 to tune to a desired channel and assemble data packets to form complete programs. The program specific information also contains ancillary program content rating information (e.g., an age based suitability rating), program guide information (e.g., an Electronic Program Guide-EPG) and descriptive text related to the broadcast programs as well as data supporting the identification and assembly of this ancillary information.

Transport decoder 40 provides MPEG compatible video, audio, and sub-picture streams to MPEG decoder 42. The video and audio streams contain compressed video and audio data representing the selected channel program content. The sub-picture data contains information associated with the channel program content such as rating information, program description information, and the like.

MPEG decoder 42 cooperates with a random access memory (RAM) 44 to decode and decompress the MPEG compatible packetized audio and video data from unit 40 and derives decompressed program representative pixel data. As discussed in further detail below, decoder 42 includes an HFC (shown in FIG. 3) which utilizes the buffering system (shown in FIGS. 3-7) of the present invention. Decoder 42 also assembles, collates and interprets the sub-picture data from unit 40 to produce formatted program guide data for output to an internal OSD module. The OSD module cooperates with RAM 44 to process the sub-picture data and other information to generate pixel mapped data representing subtitling, control, and information menu displays including selectable menu options and other items for presentation on plasma display device 30 in accordance with the present invention.

The control and information displays, including text and graphics produced by the OSD module, are generated in the form of overlay pixel map data under direction of controller 34. The overlay pixel map data from the OSD module is combined and synchronized with the decompressed pixel representative data from decoder 42 under direction of controller 34. Combined pixel map data representing a video program on the selected channel together with associated sub-picture data is encoded by decoder 42 and output to plasma display device 30, via display drivers 46, for display.

Figure 3:
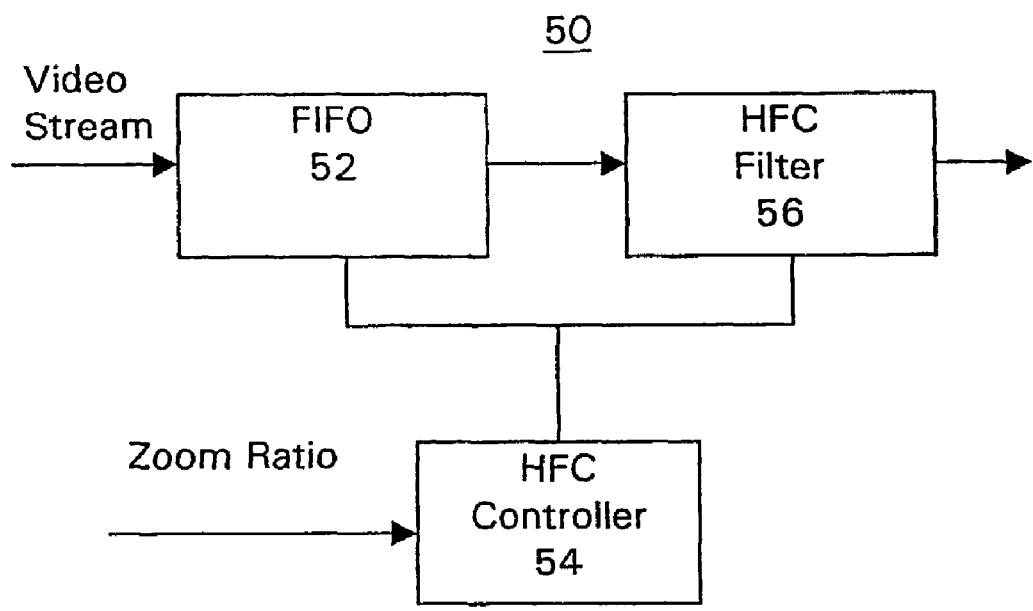
FIG. 3 is a block diagram of the horizontal format converter of the present invention.

Referring to FIG. 3, an HFC 50 of the present invention is shown. HFC 50 includes a FIFO buffer 52, an HFC filter 56, and an HFC controller 54. In operation, pixels (e.g., luma or chroma pixel representative data) of a video stream are written into FIFO buffer 52 under the control of HFC controller 54. HFC controller 54, in response to the reception of a zoom ratio signal (discussed above), causes HFC filter 56 to read a selectable number of pixels from FIFO buffer 52 such that HFC filter 56 can generate the desired output pixels. More specifically, HFC controller 54 adapts the reading of pixels from FIFO buffer 52 to HFC filter 56 in accordance with an expansion mode (if the zoom ratio greater than 1), a compression mode (if the zoom ratio is less than 1), and a pass through mode (if the zoom ratio is equal to 1).

Referring to FIGS. 4-7, an exemplary flow of pixels through FIFO buffer 52 (as controlled by controller 54) during the compression mode is shown. In the example, controller 54 has received a zoom ratio of 4/10.

Figure 4:
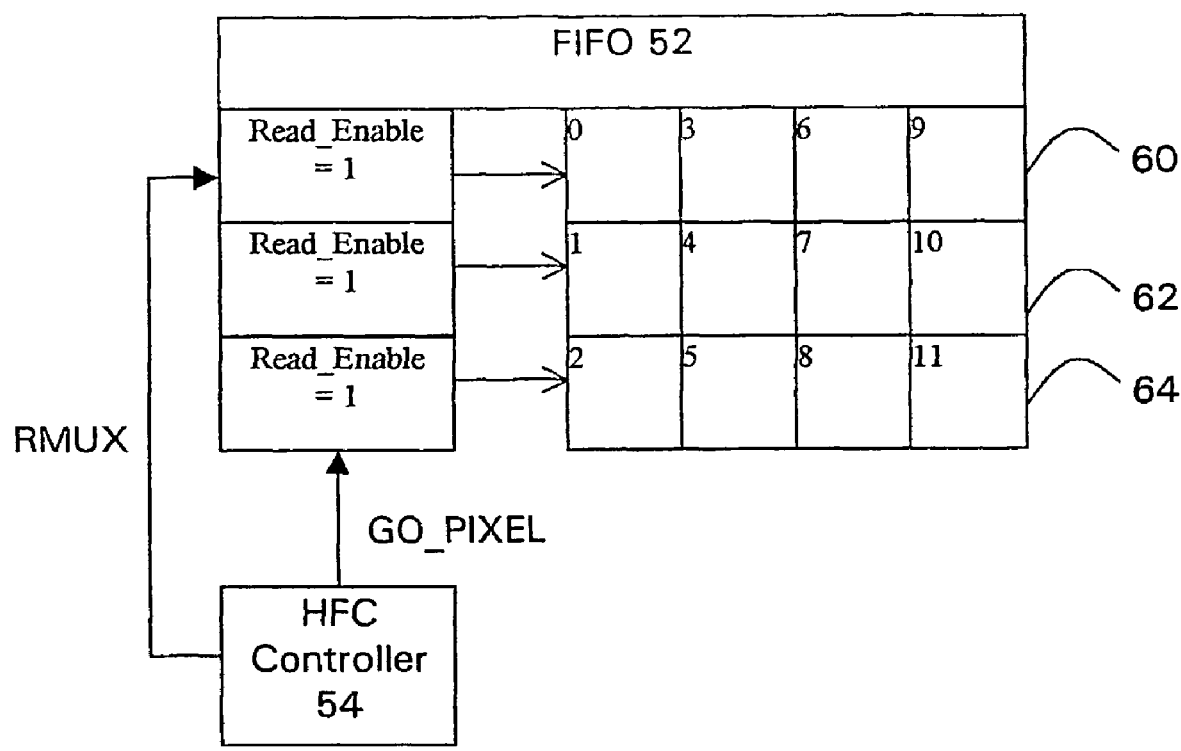
FIG. 4 is a block diagram illustrating an exemplary flow of data in the buffering system of the present invention.

Turning now to FIG. 4, the first twelve pixels of a buffered pixel line are shown in FIFO buffer 52. FIFO buffer 52 is split into three parallel buffers 60, 62 and 64 and the pixels are written into buffers 60, 62 and 64 in an alternating fashion wherein the first pixel (pixel 0) is written to buffer 60, the second pixel (pixel 1) is written to buffer 62, the third pixel (pixel 2) is written to buffer 64, the fourth pixel (pixel 3) is written to buffer 60, the fifth pixel (pixel 4) is written to buffer 62, and so on until the pixel line is buffered in FIFO buffer 52. The alternating method of buffering the pixels into buffers 60, 62 and 64 may be expressed as the following algorithm:

input buffer=(previous input buffer+1)%3

It should be noted that FIFO buffer may include additional parallel circular buffers as required in a digital video receiving system, as known by those skilled in the art.

After receiving the zoom ratio signal, HFC controller 54 determines, via an algorithm stored in a memory (not shown), the sequence of pixels to be read from the circular buffers 60-64 of FIFO buffer 52. If the zoom ratio is 4/10, ten input pixels are required to generate four output pixels, as discussed above. This is achieved by deriving the first output pixel from the first three input pixels (pixels 0, 1 and 2), the second output pixel from the next two input pixels (pixels 3 and 4), the third output pixel from the next three input pixels (pixels 5, 6 and 7), and the fourth output pixel from the next two input pixels (pixels 8 and 9). Thus, HFC controller 54 determines that a variable sequence of input pixels (3, 2, 3, 2 . . . ) must be read from FIFO buffer 52 to HFC filter 56 in order for HFC filter 56 to generate the four desired output pixels. It should be noted that HFC controller 54 will continue the compression process until a new zoom ratio is received.

At the beginning of a read operation from FIFO buffer 52, an internal register (RMUX) of HFC controller 54 points to the circular buffer containing the first pixel (pixel 0) of the buffered pixel line. Since the first set of pixels to be read from FIFO buffer 52 is a set of three pixels, HFC controller 54 generates a GO_PIXEL signal that indicates that three pixels are to be read from FIFO buffer 52 to HFC filter 56. More specifically, the RMUX register indicates that pixels are to be read from FIFO buffer 52 starting at circular buffer 60 and the GO_PIXEL signal, in turn, enables the three circular buffers starting at circular buffer 60 and ending at circular buffer 64. Afterwards, HFC filter 56 (under the control of HFC controller 54) reads three pixels (pixels 0, 1, 2), in parallel, from circular buffers 60, 62 and 64.

Figure 5:
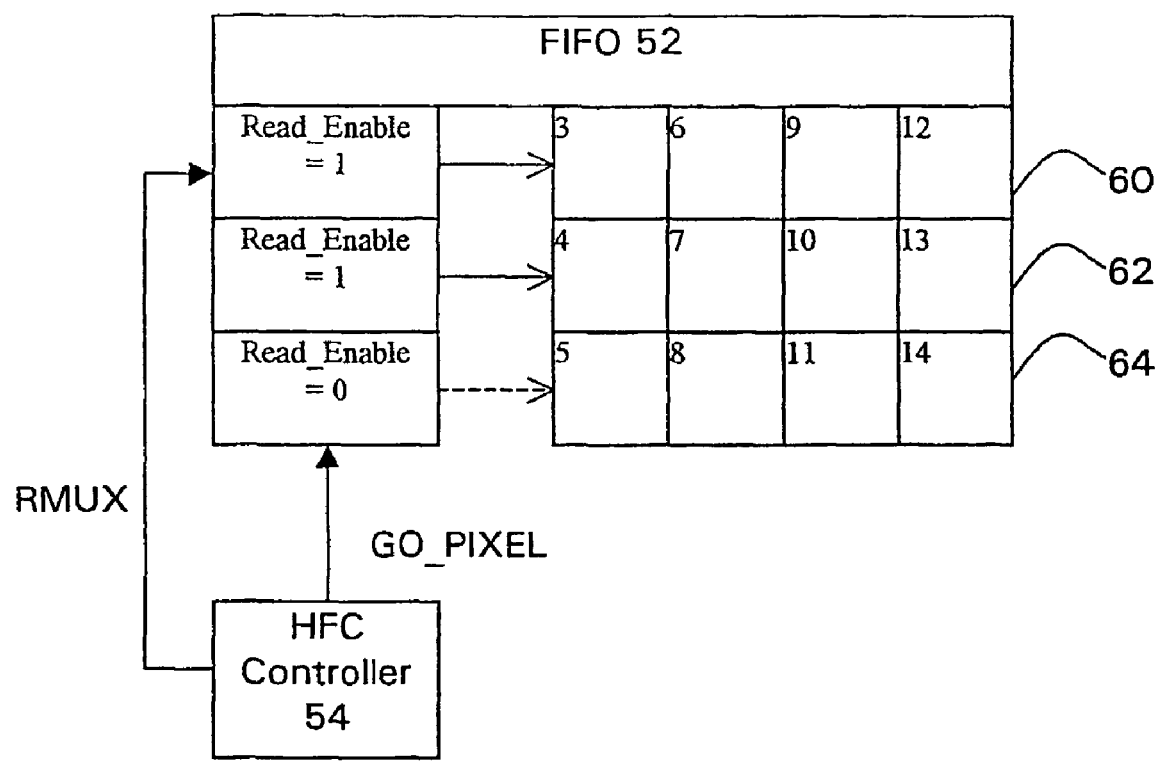
FIG. 5 is a block diagram illustrating an exemplary flow of data in the buffering system of the present invention.

Next, as shown in FIG. 5, the RMUX register of HFC controller 54 is updated to point to circular buffer 60 which contains the next unread pixel (pixel 3). Since the second set of pixels to be read from FIFO buffer 52 is a set of two pixels, HFC controller 54 generates a GO_PIXEL signal that indicates that two pixels are to be read from FIFO buffer 52 to HFC filter 56. More specifically, the RMUX register indicates that pixels are to be read from FIFO buffer 52 starting at circular buffer 60 and the GO_PIXEL signal, in turn, enables two circular buffers starting at circular buffer 60 and ending at circular buffer 62. Afterwards, HFC filter 56 (under the control of HFC controller 54) reads two pixels (pixels 3 and 4), in parallel, from circular buffers 60 and 62.

Figure 6:
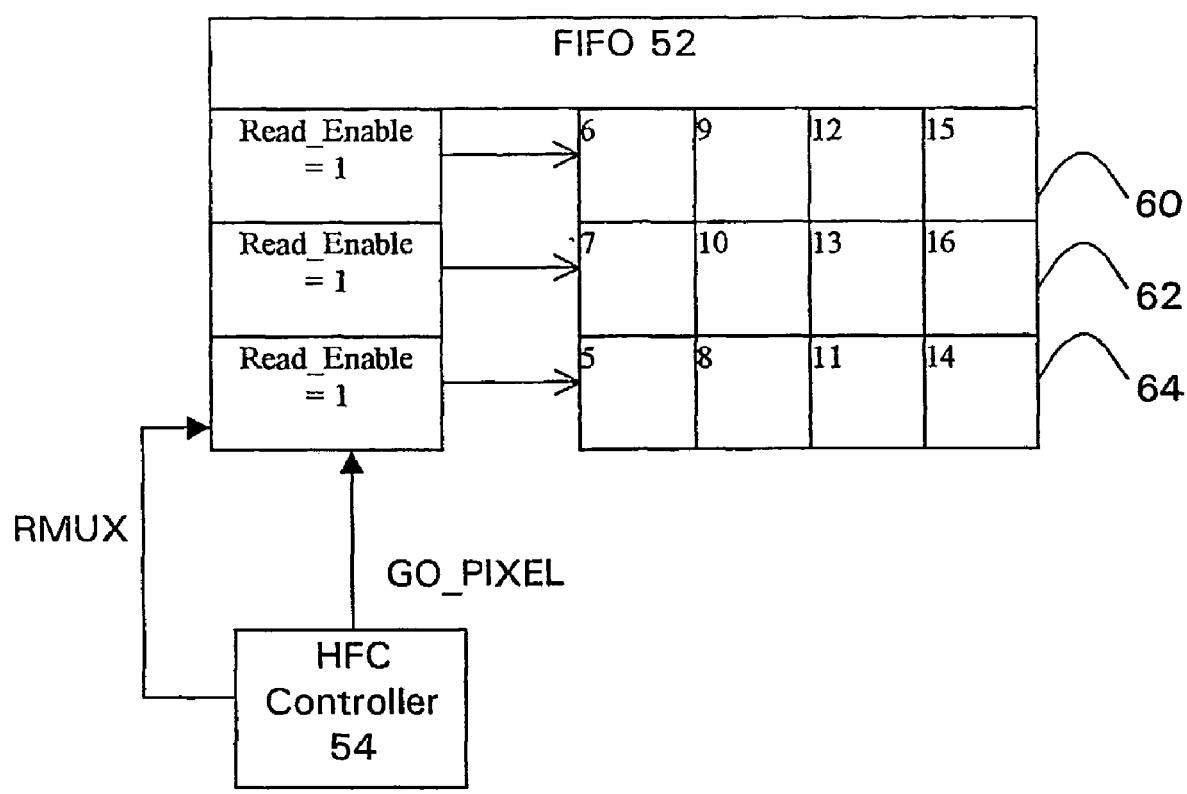
FIG. 6 is a block diagram illustrating an exemplary flow of data in the buffering system of the present invention.

Turning now to FIG. 6, the RMUX register of HFC controller 54 is updated to point to circular buffer 64 which contains the next unread pixel (pixel 5). Since the third set of pixels to be read from FIFO buffer 52 is a set of three pixels, HFC controller 54 generates a GO_PIXEL signal that indicates that three pixels are to be read from FIFO buffer 52 to HFC filter 56. More specifically, the RMUX register indicates that pixels are to be read from FIFO buffer 52 starting at circular buffer 64 and the GO_PIXEL signal, in turn, enables three circular buffers starting at circular buffer 64 and ending at circular buffer 62. Afterwards, HFC filter 56 (under the control of HFC controller 54) reads three pixels (pixels 5, 6 and 7), in parallel, from circular buffers 64, 60 and 62.

Figure 7:
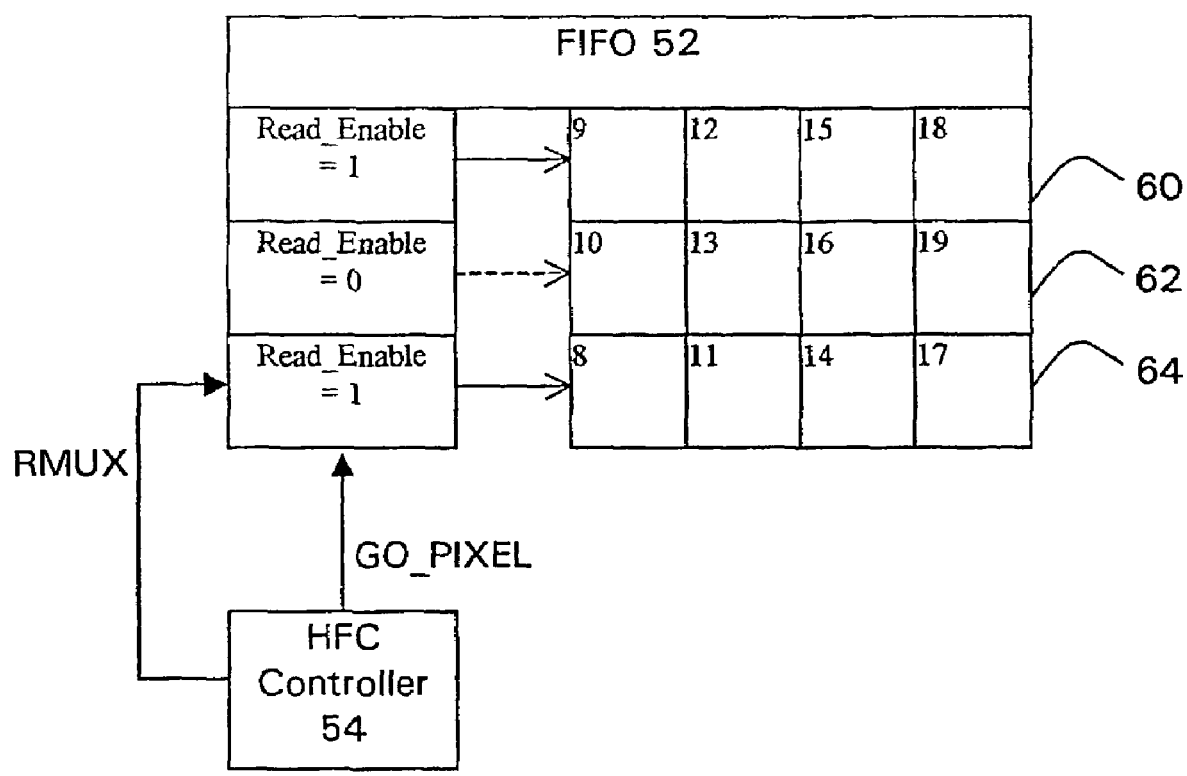
FIG. 7 is a block diagram illustrating an exemplary flow of data in the buffering system of the present invention.

Referring now to FIG. 7, the RMUX register of HFC controller 54 is updated to point to circular buffer 64 which contains the next unread pixel (pixel 8). Since the fourth set of pixels to be read from FIFO buffer 52 is a set of two pixels, HFC controller 54 generates a GO_PIXEL signal that indicates that two pixels are to be read from FIFO 52 to HFC filter 56. More specifically, the RMUX register indicates that pixels are to be read from FIFO buffer 52 starting at circular buffer 64 and the GO_PIXEL signal, in turn, enables two circular buffers starting at circular buffer 64 and ending at circular buffer 60. Afterwards, HFC filter 56 (under the control of HFC controller 54) reads two pixels (pixels 8 and 9), in parallel, from circular buffers 64 and 60.

In the expansion mode, HFC controller 54 adapts the reading of pixels from circular buffers 60, 62 and 64 such that selected pixels previously read from circular buffers 60, 62 and 64 are repeatedly processed by HFC filter 56. This repeated processing of selected pixels allows HFC filter 56 to expand a pixel line buffered in FIFO buffer 52. In the pass through mode, HFC controller 54 adapts the reading of pixels from circular buffers 60, 62 and 64 such that the pixels are read from circular buffers 60, 62 and 64 buffers to HFC filter 56 in the same alternating fashion as the pixels were buffered in circular buffers 60, 62 and 64. In other words, the pixels are read from FIFO buffer 52 in accordance with the following algorithm:

output buffer=(previous output buffer+1)%3

HFC controller 54 may selectively shut off one or more of circular buffers 60, 62 and 64 if three buffers are not necessary for buffering a pixel line. Shutting off unnecessary buffers saves power and can extend battery life if the buffering method and system of the present invention is incorporated into a battery-operated device.

It should be noted that the present invention may be described as a spiral coil circular buffer wherein the circular buffer read enables generated by HFC controller 54 have a pattern similar to spiral coil.

Thus, the buffering method and system of the present invention facilitates the processing of a horizontal pixel line in a HFC by adapting an HFC buffer such that a variable sequence of parallel pixels may be read from the HFC buffer to an HFC filter without the use of complex processing circuit.

While the present invention has been described with reference to the preferred embodiments, it is apparent that various changes may be made in the embodiments without departing from the spirit and the scope of the invention, as defined by the appended claims.

The invention claimed is:

1. A buffering system for facilitating the processing of pixels in a horizontal format converter, the system comprising:
 a FIFO buffer for buffering an input pixel line including a plurality of pixels, the FIFO buffer also including a plurality of FIFO buffers in parallel and wherein the plurality of pixels are buffered in the plurality of parallel FIFO buffers in an alternating fashion;
 a filter for processing pixels read from the FIFO buffer to generate an output pixel line; and
 a controller for adapting the reading of pixels from the FIFO buffer to the filter such that a variable sequence of pixels may be read from the FIFO buffer to the filter in accordance with an expansion mode, a compression mode, and a pass through mode,
 wherein the controller, in accordance with the compression mode, adapts the reading of pixels from the plurality of parallel FIFO buffers such that selected pixels are read from selected FIFO buffers of the plurality of FIFO buffers to the filter.

2. The buffering system of claim 1, wherein the controller, in accordance with the expansion mode, adapts the processing of pixels previously read from the plurality of parallel FIFO buffers such that selected pixels are repeatedly processed by the filter to generate an expanded output pixel line.

3. The buffering system of claim 1, wherein the controller, in accordance with the pass through mode, adapts the reading of pixels from the plurality of parallel FIFO buffers such that the pixels are read from the plurality of parallel FIFO buffers to the filter in the same alternating fashion as the plurality of pixels were buffered in the plurality of FIFO buffers.

4. The buffering system of claim 1, wherein the selected pixels are read from selected FIFO buffers such that a variable sequence of parallel pixels are read from the plurality of FIFO buffers to the filter.

5. The buffering system of claim 1, wherein the controller shuts off selected FIFO buffers of the plurality of FIFO buffers when the selected FIFO buffers are not needed for the buffering of the input pixel line.

6. The buffering system of claim 1, wherein the horizontal format converter is incorporated into a digital video receiving system.

7. The buffering system of claim 6, wherein the digital video receiving system operates in a plasma display.

8. A memory management process for reading pixels of a pixel line buffered in a plurality of parallel circular buffers to a filter for expansion or compression of the pixel line, the process comprising the steps of:

determining if the pixel line buffered in the circular buffer needs to be compressed or expanded;

reading the pixels of the pixel line from the circular buffer to the filter such that the filter can compress or expand the input pixel line, wherein the reading includes reading the pixels from selected circular buffers of the plurality of circular buffers when the pixel line in the circular buffer is to be compressed; and passing the expanded or compressed pixel line from the filter to downstream processing circuitry for further processing of the pixel line prior to display on a display device.

9. The memory management process of claim 8, wherein the pixels are read from the selected circular buffers such that a variable sequence of parallel pixels are read from the selected circular buffers to the filter.

10. The memory management process of claim 8, wherein the circular buffer is a plurality of parallel circular buffers that can be selectively turned off when not required for buffering the pixel line.

11. The memory management process of claim 8, wherein the process is incorporated into the operation of a horizontal format converter of a digital video receiving system.

12. The memory management process of claim 11, wherein the digital video receiving system operates in a plasma display.

13. A buffering system for compressing or expanding a pixel line including a plurality of pixels, the buffering system comprising:

buffering means for buffering the pixel line the buffering means including a spiral coil circular buffer having a plurality of parallel circular buffers that can be selectively read from such that a variable sequence of parallel pixels is provided;

filter means for expanding or compressing the buffered pixel line; and means for reading the variable number of pixels of the buffered pixel line from the buffering means to the filter means.

14. The buffering system of claim 13, wherein the buffering system is incorporated into a horizontal format converter.

15. The buffering system of claim 14, wherein the horizontal format converter operates in a digital video receiving system of a plasma display.

16. A buffering system for facilitating the processing of pixels in a horizontal format converter, the system comprising:

a FIFO buffer for buffering an input pixel line including a plurality of pixels, the FIFO buffer also including a plurality of FIFO buffers in parallel and wherein the plurality of pixels are buffered in the plurality of parallel FIFO buffers in an alternating fashion;

a filter for processing pixels read from the FIFO buffer to generate an output pixel line; and a controller for adapting the reading of pixels from the FIFO buffer to the filter such that a variable sequence of pixels may be read from the FIFO buffer to the filter in accordance with an expansion mode, a compression mode, and a pass through mode, wherein the controller shuts off selected FIFO buffers of the plurality of FIFO buffers when the selected FIFO buffers are not needed for the buffering of the input pixel line.

* * * * *